(12) United States Patent
Bradshaw, Jr.

(10) Patent No.: US 6,236,854 B1
(45) Date of Patent: May 22, 2001

(54) METHOD AND APPARATUS FOR CONTROLLING A CONFERENCE CALL

(75) Inventor: Charles W. Bradshaw, Jr., Richardson, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/135,204

(22) Filed: Aug. 17, 1998

(51) Int. Cl.$^7$ ................................................ H04M 3/42
(52) U.S. Cl. ................................... 455/416; 379/204
(58) Field of Search .................................. 455/416, 414, 455/420; 379/204, 202

(56) References Cited

U.S. PATENT DOCUMENTS

| | | | |
|---|---|---|---|
| 5,473,605 | * 12/1995 | Grube | 370/62 |
| 5,815,817 | * 9/1998 | Suzuki | 455/509 |
| 5,842,136 | * 11/1998 | Tuulos | 455/519 |
| 5,889,844 | * 3/1999 | Kim | 379/202 |
| 6,026,295 | * 2/2000 | Okada | 455/416 |

* cited by examiner

Primary Examiner—Daniel Hunter
Assistant Examiner—Nick Corsaro
(74) Attorney, Agent, or Firm—John D. Crane

(57) ABSTRACT

A method and apparatus for controlling multi-party conference calls includes circuitry which is operable according to a new conference call protocol. The protocol and accompanying apparatus and method allow a conference call controlling party to selectively have private conversations with one of the subject parties in the conference call. Additionally, the controlling conference call party may selectively drop conference call participants. A mobile station includes a store for storing the conference call participant "subject party set-up number" in relation to the subject party number and/or name. The mobile station also allows the conference call controller to scroll up and down a list of conference call participants. This allows the controller to be certain of a conference call participant's "call set-up number" when using a command for a private call or a command to drop a conference call participant.

13 Claims, 4 Drawing Sheets

| CHANGES FROM CONFERENCE CALL WITH Cg Pty & CP1 & CP2 & CP3 |||||||
|---|---|---|---|---|---|
| | DIGIT | KEY | SEND | GROUP 1 | GROUP 2 |
| A | 1 | | ✓ | Cg Pty & CP1 | CP2 & CP3 |
| B | 2 | | ✓ | Cg Pty & CP2 | CP1 & CP3 |
| C | 3 | | ✓ | Cg Pty & CP3 | CP2 & CP2 |
| D | | | ✓ | Cg Pty & CP1 & CP2 & CP3 | |
| E | 1 | # | ✓ | Cg Pty & CP2 & CP3 | |
| F | 2 | # | ✓ | Cg Pty & CP1 & CP3 | |
| G | 3 | # | ✓ | Cg Pty & CP1 & CP2 | |
| H | PHONE NO. | | ✓ | Cg Pty & CP$_{PHONE\ NO.}$ | | and to let the call go
METHOD AND APPARATUS FOR CONTROLLING A CONFERENCE CALL

CROSS REFERENCE TO RELATED APPLICATIONS

Cross reference is made to the following co-pending patent applications, each being assigned to the same assignee as the present invention and the teachings included herein by reference:

| SERIAL NUMBER | TITLE | FILED |
|---|---|---|
| | Method and Apparatus For Identifying A Conference Call Participant | 8/17/98 |

1. Field

This invention generally relates to telecommunication systems and, more specifically, relates to wireless communication devices adapted to support conference calling between multiple parties.

2. Description of Related Art

As telecommunication systems evolve, an increasing demand exists for subscriber features in wireless telecommunication systems that have only recently been introduced for wireline networks and systems. One example of a user feature which has recently been introduced in wireline networks and which is now being introduced into wireless transceiver communication networks is that of caller ID feature. The caller ID subscriber feature is one which identifies a calling party by phone number. Another related subscriber feature is that of providing a caller ID in conjunction with the "call waiting" subscriber feature. Call waiting is a subscriber feature that allows a subject party to switch from a present call (original call) to an incoming call and then back to the original call. By providing a caller ID for the incoming call, a called party can decide, while carrying a conversation with the present call, whether to switch over to the incoming call or whether to let the call go unanswered or to let it be answered by a voice mail system.

Another subscriber feature introduced initially in wireline networks and now being applied to wireless networks is that of conference calling. A particular challenge in incorporating conference calling in wireless transceivers, however, is that there is limited space for dedicated buttons for the various features. Accordingly, it can be challenging to incorporate new subscriber features with existing keypads in an intuitive manner. Because of this engineering restriction, some subscriber features, such as conference calling, have not been fully integrated into the wireless transceiver communication networks. Additionally, the sequences of key strokes for achieving specific effects in a conference call inhibit effective use of the service. These key stroke sequences are not only difficult to properly perform, but also are difficult to remember when needed.

For one example, the use of the "Send" key is inconsistent in result as used in many current systems. This result is usually based on the call state. Thus, the use of the "Send" key is not always intuitive. For example, in a simple two party call, "Send" acts to initiate the setting up of an additional call to create a three way conference call. If a three way conference call is set up, however, "Send" acts to drop the last added party. Thus, in one state, a subject party is added by the depression of "Send" while in another state, a subject party dropped. Along the same lines, if a two party call is in place and a call is being received, "Send" acts to place the current call on hold and to establish a call with the incoming party. Subsequent depressions of the Send key serves to toggle between calls. If a conference call is set up having three or more called parties, a controlling party cannot selectively place the subject parties on hold or to exclude them from a private conversation with a selected subject party. Typically, the calling party is the controlling party and the called parties are the subject parties. Occasionally, however, the controlling party may receive a call from someone wanting to be added to the conference call. Accordingly, this application refers to a controlling party and to subject parties.

Another problem that currently exists with respect to conference calling in wireless transceiver and wireline communication networks is that the inclusion of a participant into or removal of a participant from a conference call can only occur in relation to the call set up order. More specifically, a first subject party cannot be dropped while a call is maintained with a second subject party.

What is needed, therefore, is an apparatus and a method that facilitates the creation of conference calls having a greater number of conference call participants. Additionally, there is a need for a conference call feature that allows a controlling party to selectively drop or communicate with subject parties in the conference. There also is a need for a conference call feature that allows a calling party to selectively place subject parties into "hold" status, or into a private conversation with themselves. Additionally, there is a need for a conference call feature that allows the controlling party to selectively have a private conversation with any one of the subject parties. Finally, there exists a need for a conference calling subscriber feature that attains each of the aforementioned aspects with a protocol command set that is logically consistent and that is easier to remember than current protocols.

SUMMARY OF THE INVENTION

A method and an apparatus are provided that allows a controlling party to add an unlimited (theoretically) number of subject parties, that allows the controlling party to selectively enter into a private conversation with anyone of the subject parties regardless of the call placement order, that allows a controlling party to selectively drop anyone of the subject parties regardless of the call placement order, and that is logically consistent and easy to remember by the consumer.

More specifically an apparatus and a system are provided that support a protocol that allows each of the aforementioned aspects to be incorporated into a wireless transceiver telecommunication network. In general, a controlling party adds subject parties to a conference call by entering the digits of each subject party and depressing the Send key. Typically, the controlling party is the calling party that originates the call. Once the conference call is set, the controlling party can selectively enter into private conversations with anyone of the subject parties by depressing the call set up number of the subject party and by depressing the Send key. Thereafter, the private call between the controlling party and one of the subject parties may be placed back into a conference call by the mere depression of the Send key.

Similarly, the controlling party can drop a subject party from the conference call by entering the call set up number of the subject party to be dropped followed by depressing the "#" key and by depressing the Send key. It is understood that different keys may be used to achieve the same effect. For example, the "*" key may be used in place of the "#" key. Additionally, the order of key depressions may be changed. For example, a protocol may include depression of the "#" key prior to depression of the subject party set up number. Alternatively, instead of specifying a set up number for either function, the system may be modified to have the controlling party enter the phone number of the subject party with whom a private conversation is desired or the phone number of the subject party that is to be dropped from the conference call.

As may be seen, the disclosed protocol includes either two or three elements according to the desired function. In general, any desired function with respect to a subject party is achieved by having the controlling party enter the subject party's call set up number prior to depression of the Send key. If a subject party is to be dropped from a conference call, however a specified key is inserted into the sequence of keys. Thus, the subject party call set up number, the specified key, and the Send key are depressed to drop a specified conference call participant. Thus, the disclosed protocol is consistent in its approach and is more memorable for the ordinary consumer.

DETAILED DESCRIPTION OF THE DRAWING

Figures 1, 2:
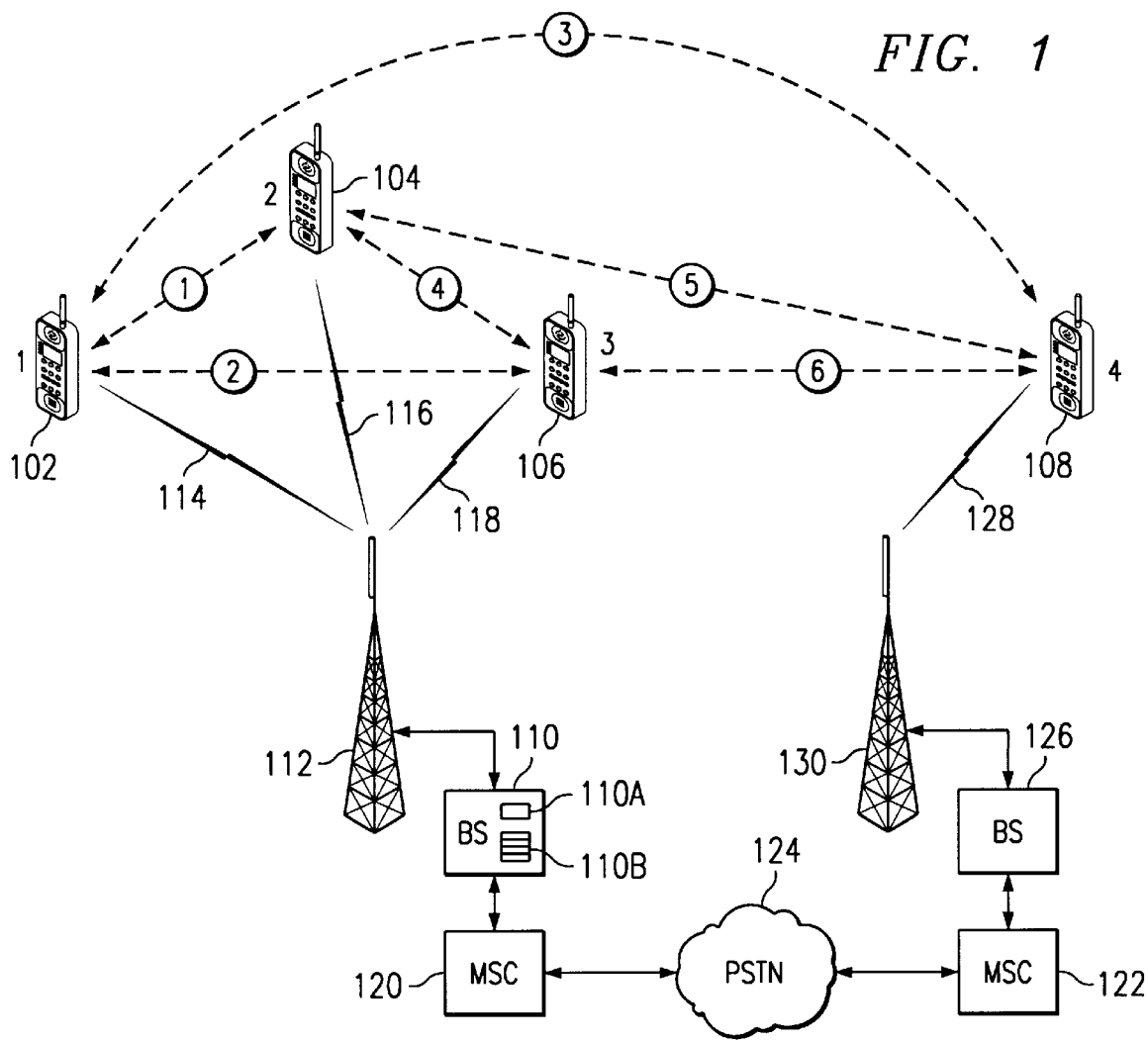
FIG. 1 is a system diagram of a wireless communication network illustrating one aspect of the present invention.
FIG. 2 is a table that illustrates the operation of the inventive system with respect to a conference call protocol command set in accordance with a preferred embodiment of the invention.

FIG. 1 is a system diagram of a wireless communication network illustrating one aspect of the present invention. Referring now to FIG. 1, a controlling party (Cg Pty) is in communication with a first subject party (CP1), a second subject party (CP2) and a third subject party (CP3). The controlling party is communicating through mobile station 102 while the first, the second and the third subject parties are communication through mobile stations 104, 106 and 108, respectively. As may be seen, the controlling party and the three subject parties are in a four-way conference call. FIG. 1 illustrates a plurality of virtual communication paths 1, 2, 3, 4, 5 and 6 to illustrate that each mobile station is in communication with the other mobile station in a conference call.

With respect to the true communication paths, mobile station (MS) 102 is in communication with base station 110 through antenna 112 over communication link 114. BS 110 also is in communication with MS 104 and MS 106 through communication link 116 and 118, respectively. Also as may be seen, BS 110 is coupled to MSC 120 which in turn is coupled to MSC 122 through the public switched telephone network (PSTN) 124. MSC 122 also is coupled to BS 126 with BS 126 communicating with MS 108 over communication link 128 through antenna 130.

In operation, Cg Pty communicates with CP3 (as illustrated by virtual communication path 3) by way of BS 110, MSC 120, PSTN 124, MSC 122, and BS 126. In contrast, Cg Pty communicates with CP1 and CP2 only through BS 110. As may be seen, MS 104 and MS 106 are in the same geographic region (cell site area) as MS 102 and, therefore, are served by the same BS 110. The network as shown in FIG. 1 is for illustrative purposes. It should be understood that the invention may be implemented in any different network arrangement and that the invention is not limited to the network topology illustrated in FIG. 1.

Continuing to refer to FIG. 1, it may be seen that BS 110 includes logic circuitry 110 A and store 110 B. Logic circuitry 110 A is for controlling and coordinating the conference calling feature according to the present invention. As will be described in greater detail below, logic circuitry 110A allows Cg Pty to add subject parties CP2 and CP3 to its call with CP1 to create a four way conference call. Additionally, logic circuitry 110A allows Cg Pty to create a private call between itself and any one of CP1, CP2, and CP3 while the conference call is in place. Finally, logic circuitry 110 A allows Cg Pty to drop any of CP1, CP2, and CP3 from the conference call. While FIG. 1 illustrates only a four way conference call, the system of FIG. 1 is not contained by design to a specified number of conference call participants. As the design does not limit the number of participants, the only limitations are driven by from system and network throughput capacity. While FIG. 1 illustrates logic circuitry 110 A and store 110 B as residing in BS 110, circuitry 110 A and store 110 B could also reside in a mobile switching center such as MSC 120 of FIG. 1.

FIG. 2 is a table that illustrates the operation of the inventive system with respect to a conference call protocol command set in accordance with a preferred embodiment of the invention. Referring now to FIG. 2, column 2 is for illustrating what digits are depressed on a mobile station key pad. Column 3 is for indicating whether a specified key has been depressed to achieve a desired effect during a conference call. In the preferred embodiment of the invention, the specified key is the "#" key. Column 4 is for indicating the depression of the "Send" key during an ongoing call to initiate the desired conference call effect. The types of conference call effects that can be achieved in a four-way conference call are illustrated in columns 5 and 6. As may be seen, the types of conference call effects relate to what parties remain in a private conference call with the controlling party and what parties are placed into a separate conversation.

In operation, columns 2, 3, and 4 collectively reflect the various combinations of key pad key depressions to achieve the various types of conference calling effects as illustrated collectively in columns 5 and 6. Each row A–H illustrates one sequence of key pad key depressions and one set of corresponding results. Referring now to row A of FIG. 2, depression of the "1" digit and of the "Send" key causes CP1 to be placed in a private call with the controlling party (Cg Pty) as indicated in column 5. Correspondingly, the remaining subject parties CP2 and CP3 are placed in their own private call as shown in column 6. If, by way of example, this conference call included four subject parties, then CP2, CP3 and the fourth subject party would be placed in the private call reflected in column 6. Similarly, as shown in row B and row C, depression of a "2" or a "3" in conjunction with the "Send" key places the controlling party in a private call with the second or third subject party (CP2 or CP3, respectively). In both cases, all remaining subject parties are placed into their own call as indicated in column 6.

With respect to the example illustrated in rows A, B, and C wherein the Cg Pty selectively establishes a private call with one of the subject parties CP2, CP3 or CP4, row D illustrates the protocol for re-establishing the four-way conference call according to the preferred embodiment of the invention. More specifically, mere depression of the "Send" key re-establishes the conference call between the controlling party (Cg Pty) and the three subject parties (CP1, CP2 and CP3).

Continuing to refer to FIG. 2, depression of a "1", "2" or "3" conjunction with the depression of a specified key followed by the "Send" key causes a subject party (CP1, CP2 or CP3, respectively) to be dropped from the call. The remaining subject parties remain in the conference call with the Cg Pty. More specifically, referring now to row E, depression of the "1" key, of the "#" key and of the "Send" key causes CP1 to be dropped from the conference call. The conference call between Cg Pty and CP2 and CP3 remains. Similarly, depression of the "2" or the "3" key along with the "#" key instead of the "1" key causes the second or third subject parties (CP2 or CP3) to be dropped. In each case, the controlling party continues in the conference call with the remaining subject parties as shown in column 5, rows E, F, and G.

Row H illustrates the protocol for adding a subject party to a conference call. More specifically, the subject party's phone number is entered and the "Send" key is depressed. It should be understood that the key sequences shown in FIG. 2 reflect the key sequences of the preferred embodiment of the invention. The sequences or actual keys may be changed, however, without departing from the spirit or scope of the present inventions. For example, a "*" key may be used in place of the "#" key to indicate that a subject party is being dropped.

Figure 3:
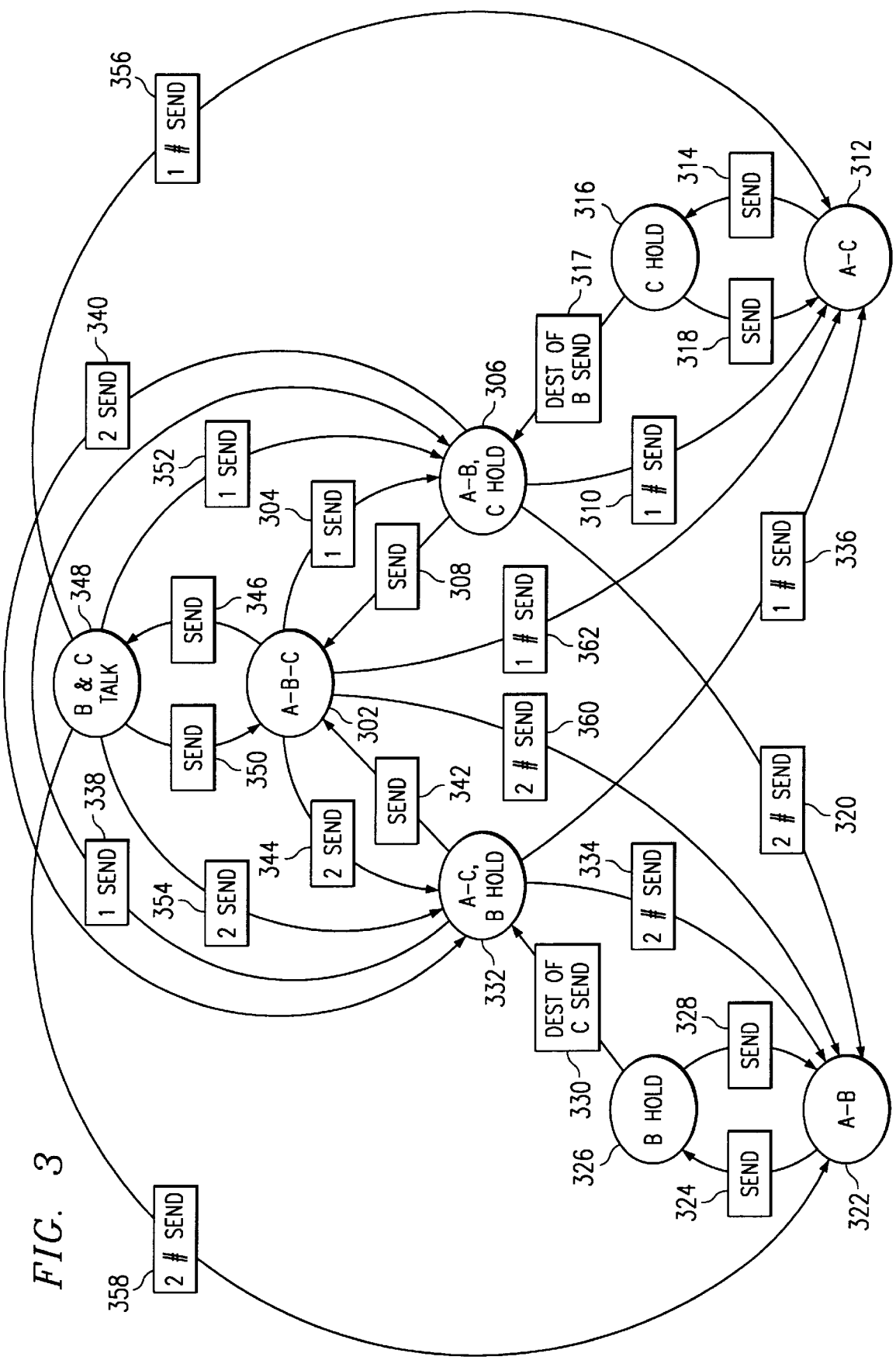
FIG. 3 is a state diagram illustrating state transition logic for a three way conference call according to the preferred embodiment of the invention.

FIG. 3 is a state diagram illustrating state transition logic for a three way conference call according to the preferred embodiment of the invention. Referring now to FIG. 3, it may be seen that the diagram assumes that the three way conference call is already established. Accordingly, for the purpose of this Figure, state 302 is the initial state once the three way conference call has been established. For the purpose of clarification, subject party B is the first subject party in the call placement order. Subject party C is the second subject party in the call placement order.

Continuing to refer to FIG. 3, depression 304 of "1" and "Send" causes the communication network to enter State 306. Wherein CP2 is placed on hold while Cg Pty and CP1 have a private conversation. Depression 308 of "Send" causes the network to revert back to state 302 to return all parties to the conference call. From state 306, depression 310 of "1", "#" and "Send" causes the network to go to state 312, wherein CP1 is dropped from the conference call. As may be seen, only Cg Pty and CP2 are participants in the call. Accordingly, depression 314 of "Send" causes the system to go to state 316 wherein CP2 is placed on hold. Depression 318 of "Send" merely causes the network to revert to state 312 wherein Cg Pty and CP2 are placed back into communication. Alternatively, depression 317 causes the network to transition to state 306 wherein CP2 remains on hold while Cg Pty and CP1 communicate. To clarify, depression 317 includes the entry of the phone number of CP1.

Referring again to state 306, depression of "1" and "send" has no effect on the call participants and, therefore is not shown. Depression 320 of "2" and "#" and "Send", however causes the network to transition to state 322 wherein CP2 has been dropped from the conference call. Depression 324 of "Send" causes the network to transition to state 326 wherein CP1 is placed on hold. Depression 328 causes the network to revert back to state 322 wherein Cg Pty and CP1 may continue their communication. From state 326, depression 330 causes the network to transition to state 332 wherein CP1 remains on hold while Cg Pty and CP2 communicate. As before with, depression 330 includes the entry of the phone number of CP2.

While in state 332, depression of "2" and "send" has no effect on the conference call. Depression 334 of "2", "#" and "Send", however, causes the network to transition to state 332 wherein CP2 is dropped from the conference call. Similarly, depression 336 of "1", "#" and "Send" causes the network to transition to state 312 wherein CP1 is dropped from the call. Continuing to examine transitions from state 332, depression 338 of "1" and "Send" causes the network to transition to state 306 wherein CP1 is taken off hold and is placed into communication with Cg Pty while CP2 is placed on hold.

Conversely, in state 306, depression 340 of "2" and "Send" causes the network to transition to state 332 wherein CP2 is taken off hold and is placed in communication with Cg Pty while CP1 is placed on hold. In State 332, depression 342 of "Send" causes the network to transition to state 302 wherein Cg Pty is in communication with both CP1 and CP2 in a conference call. From state 302, depression 344 of "2" and "Send" causes the network to transition to state 332 wherein CP1 is placed on hold.

Continuing to refer to transitions from state 302, depression 346 of "Send" causes the network to transition to state 348 wherein the controlling party effectively is placed on hold so that CP1 and CP2 may have a private conversation. Although not illustrated, Cg Pty may choose to add another subject, if desired.

There are five transitions to other states from state 348. Depression 350 of "Send" causes the network to transition to state 302 wherein Cg Pty, CP1 and CP2 have a conference call. Depression 352 of "1" and "Send" causes the network to transition to state 306 wherein CP2 is placed on hold and Cg Pty and CP1 are placed into a conversation. Depression 354 of "2" and "Send" causes the network to transition to state 332 wherein CP1 is placed on hold and Cg Pty and CP2 are placed into a conversation. Depression 356 of "1", "#" and "Send" causes the network to transition to state 312 wherein CP1 is dropped from the call. Depression 358 of "2" and "#" and "Send" causes the network to transition to state 332 wherein CP2 is dropped from the call.

Referring again to transition from State 302, depression of 360 of "2" "#" and "Send" causes the network to transition to state 322 wherein CP2 is dropped from the call. Similarly, depression 362 of "1" "#" and "Send" causes the network to transition to state 312 wherein CP1 is dropped from the call.

Figure 4:
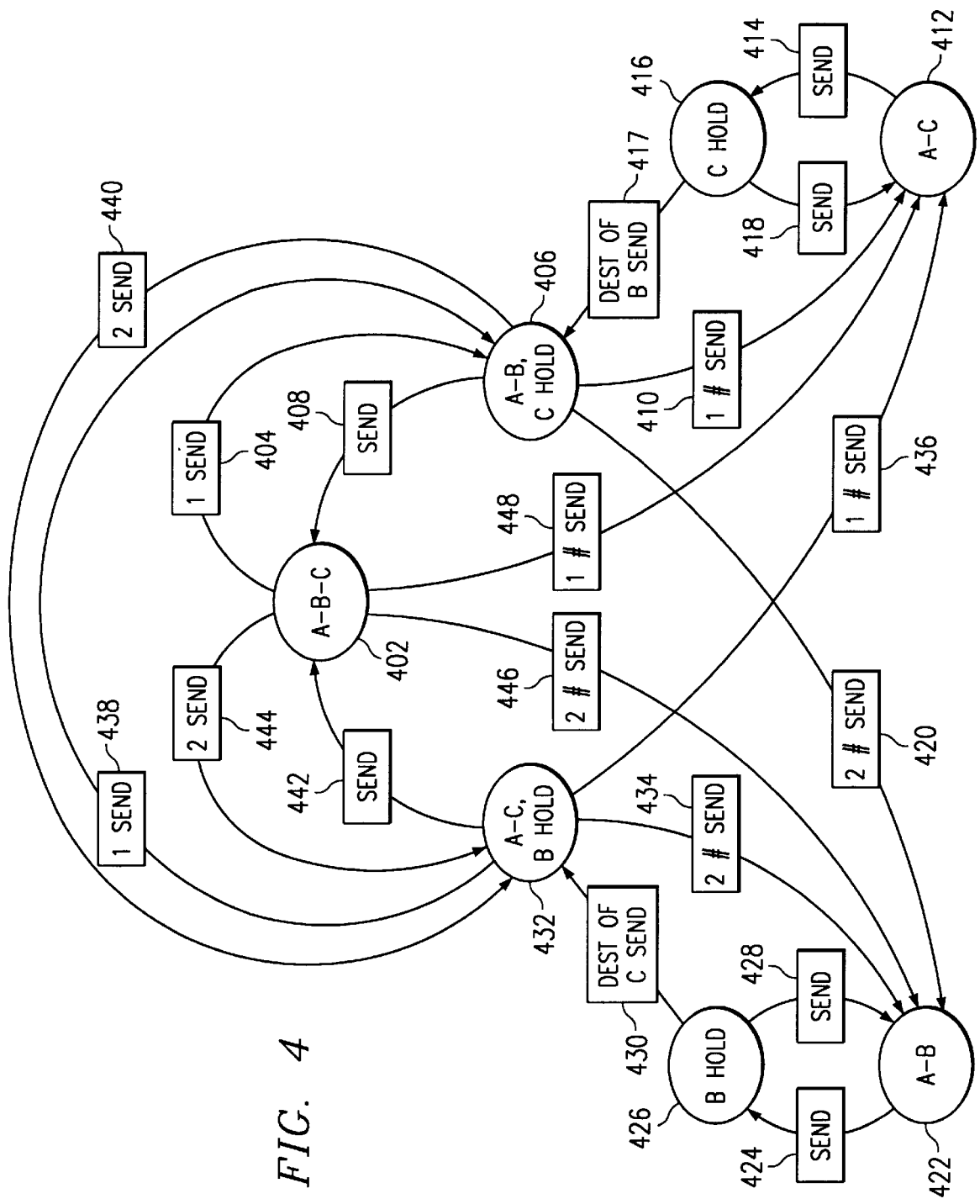
FIG. 4 is a state diagram illustrating state transition logic for a three way conference call according to second embodiment of the invention.

FIG. 4 is a state diagram illustrating state transition logic for a three way conference call according to a second embodiment of the invention. Referring now to FIG. 4, it may be seen that the diagram assumes that the three way conference call is already established. Accordingly, for the purpose of this Figure, state 402 is the initial state once the three way conference call has been established. For the purpose of clarification, subject party B is the first subject party and subject party C is the second subject party.

Continuing to refer to FIG. 4, depression 404 of "1" and "Send" causes the communication network to enter state 406, wherein CP2 is placed on hold while Cg Pty and CP1 have a private conversation. Depression 408 of "Send" causes the network to revert back to state 402 to return all parties to the conference call. From state 406, depression 410 of "1", "#" and "Send" causes the network to go to state 412. Wherein CP1 is dropped. As may be seen, only Cg Pty and CP2 are participants in the call. Accordingly, depression 414 of "Send" causes the system to go to state 416 wherein CP2 is placed on hold. Depression 418 of "Send" merely causes the network to revert to state 412 wherein Cg Pty and CP2 are placed back into communication. Alternatively, depression 417 causes the network to transition to state 406 wherein CP2 remains on hold while Cg Pty and CP1 communicate to clarify, depression 417 includes the entry of the phone number of CP1.

Referring again to state 406, depression of "1" and "Send" has no effect on the conference call while in state 406. Depression 420 of "2", "#" and "Send" causes the network to transition to state 422 wherein CP2 has been dropped from the conference call. From state 422, however, depression 424 causes the network to transition to state 426 wherein CP1 is placed on hold. Depression 428 causes the network to transition back to state 422 wherein Cg Pty and CP1 may continue their communication. From state 426, depression 430 causes the network to transition to state 432 wherein CP1 remains on hold while Cg Pty and CP2 have a conversation or communication. As before, depression 430 includes the entry of the phone number of CP2.

While in state 432, depression of "2" and "send" has no effect on the conference call. Depression 434 of "2", "#" and "Send", however causes the network to transition to state 422 wherein CP2 is dropped from the conference call. Alternatively, depression 436 causes the network to transition to state 412 wherein CP1 is dropped from the call. Continuing to examine transitions from state 432, depression 438 of "1" and "Send" causes the network to transition to state 406 wherein CP1 is taken off hold and is placed into communication with Cg Pty while CP2 is placed on hold.

Conversely, while in state 406 depression 440 of "2" and "Send" causes the network to transition from state 406 to state 432 wherein CP2 is taken off hold and is placed in communication with Cg Pty while CP1 is placed on hold. Depression 442 of "Send" causes the network to transition from state 432 to state 402 wherein Cg Pty is in communication with both CP1 and CP2 in a conference call. From state 402, depression 444 of "2" and "Send" causes the network to transition to state 432 wherein CP1 is placed on hold.

Continuing to refer to transitions from state 402 depression 446 of "2", "#" and "send" causes the network to transition from state 402 to state 422 wherein CP2 is dropped from the call. Alternatively, depression 448 of "1" and "#" and "Send" causes the network transition to state 412 wherein CP1 is dropped from the call. Finally, while not shown in FIG. 4, depression of "Send" while in state 402 has no effect on the participant in the call.

Figure 5:
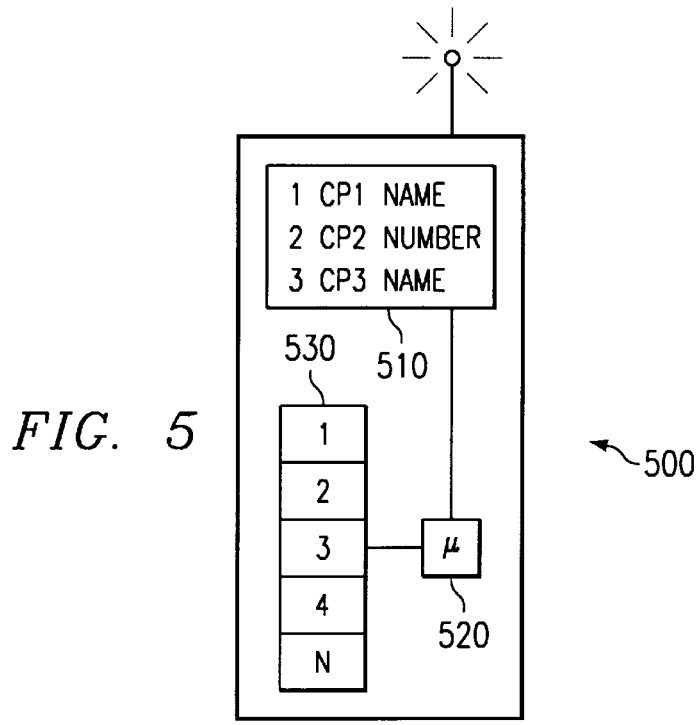
FIG. 5 is a functional block diagram of a mobile station according to the preferred embodiment of the invention.

FIG. 5 is a functional block diagram of a mobile station according to the preferred embodiment of the invention. Referring now to FIG. 5, a mobile station, shown generally at 500, includes display 510. Display 510 is for displaying calling information. Display 510 is connected to a processor 520. Processor 520 also is connected to a store 530. Processor 520 is for controlling wireless communications with a wireless tranciever (not shown) and for controlling the calling information displayed on display 510. Store 530 is for storing calling information. As may be seen, store 530 includes a plurality of memory portions (1,2, ... N), each of which is for storing select types of calling information. By way of example, each memory portion is for storing the subject party number as well as a plurality of alphanumeric characters that identify the subject party. By way of example, the subject party's phone number is stored in relation to a subject party number. In another example, the subject party name is stored (if previously entered by key pad depression or electronically in a signal) in addition to the subject party number.

In operation, processor 520 stores a subject party number in store 530 as a call is being set up with the subject party. In addition, processor 520 operates to determine whether the subject party is a second (or more) subject party and to determine what the subject party's set up number is in relation to other subject parties. Processor 520 then stores the subject party number in relation to the call set up number it determined for the subject party. Additionally, processor 520 examines the contents of store 530 to determine if it knows (has stored) an alphanumeric name, or nickname, for the subject party(ies). If processor 520 determines that it does have an alphanumeric name stored for the given subject party number, it also stores (links) the name (or a memory pointer to the stored name) in relation to the subject party set up number and the subject party phone number.

In one embodiment of operation, processor 520 displays, on display 510, the subject party set up number and the subject party phone number. In another embodiment of operation, processor 520 causes the subject party set up number and the subject party name (if stored or available) to be displayed on display 510. If the subject party name is not available, processor 520 displays the subject party phone number in relation to the subject party set up number.

MS 500 also is adapted to allow the controlling party to scroll up and down a list of subject parties. Accordingly, the controlling party is able to examine the display of MS 500 to determine the subject party (setup) number. This information is helpful as a controlling party determines what key pad key sequences are necessary for achieving a desired conference call effect. For example, if the controlling party wishes to place a specified subject party on hold, the controlling party may scroll up and down the list of subject parties and their call set up numbers to determine the proper key depression to achieve the desired conference call effect.

Figure 6:
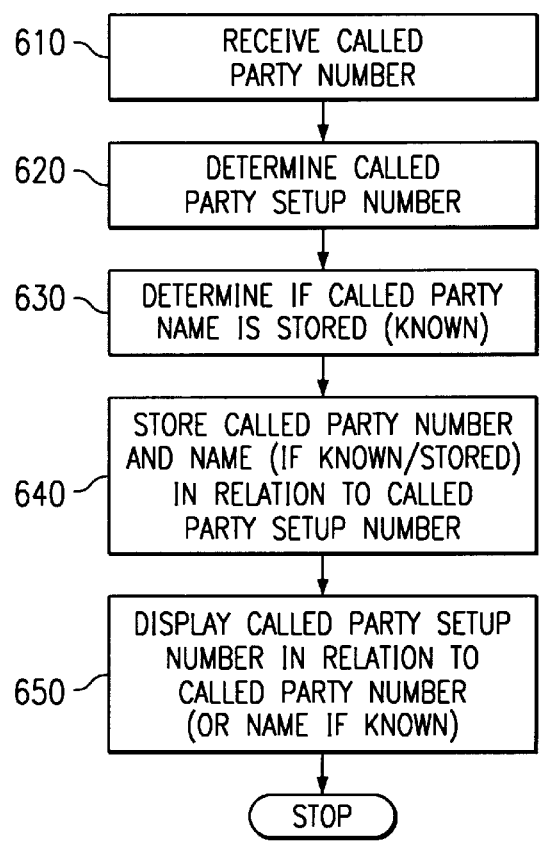
FIG. 6 is a flow chart illustrating a method for displaying calling information according to the preferred embodiment of the invention.

FIG. 6 is a flow chart illustrating a method for displaying calling information according to the preferred embodiment of the invention. Referring now to FIG. 6, a mobile station (eg., MS 500 of FIG. 5) receives a subject party number (step 610). There are many ways the subject party number may be received. One way is by entry through a mobile station keypad. Another method is through a call set up signal previously transmitted by a base station at a time that a prior call was being routed to the mobile station from the present subject party wherein the present subject party was the controlling party in the prior call. In such an example, the subject party number had necessarily been stored by the user of the mobile station.

Once the subject party number is received, the mobile station determines the subject party set up number (step 620). Thereafter, the mobile station determines if it knows the subject party name (step 630). The mobile station then stores the subject party number in relation to the subject party set up number. Additionally, the mobile station also stores the subject party name (or a pointer to the stored name) if it knows the subject party name in relation to the subject party name in relation to the subject party set up number (step 640). As with the subject party number, the subject party name could have been stored in one of several different methods (eg., digit entry, call set up signals etc.). Finally, the mobile station displays the subject party set up number in relation to one of the subject party number or name (step 650). If the mobile station knows the subject party name, it displays the name and not the number in the preferred embodiment of the invention.

The foregoing invention is advantageous in that it gives a controlling party significantly more flexibility in setting up and in controlling a conference call. Additionally, conference calling is no longer limited to only three conference call participants. The inventive protocol herein is also advantageous because it is logically consistent and, therefore, facilitates a user's ability to remember and effect conference call control commands. It should be understood that this disclosure is made in terms of a controlling party placing all of the calls for the conference call for the sake of simplicity. A controlling party, or more accurately, a conference call controlling party may also receive a call which it conferences in or adds to the conference call. For the purposes of this disclosure, such parties are treated as subject parties.

What is claimed is:

1. Circuitry for supporting multiple party wireless conference calls between a controlling party and at least two subject parties, the circuitry defining logic circuitry comprising:

logic for tracking the order in which parties were added to a multiparty call in which a controlling party and at least two subject parties are in the call;

logic for relating a plurality of keypad entry combinations to the tracked order in which the at least two called parties were added to the conference call; and logic for selectively creating a private conversation between the controlling party and a selected subject party whenever the controlling party enters said keypad combination relating to said tracked order the subject party was added to the conference call.

2. The circuitry of claim 1 wherein the circuitry includes logic for re-including the controlling party and the selected subject party into the conference call whenever the controlling party enters a select keypad entry.

3. The circuitry of claim 1 wherein the circuitry defines logic for dropping a subject party whenever the controlling party enters a select combination of keypad entries that identify which subject party from the tracked order of subject parties.

4. The circuitry of claim 1 wherein the formed within a base station whereby the base station receives communication signals reflecting keypad entries from the controlling party mobile station wherein the base station creates the private conversations and adds and drops called parties from a conference call responsive to the controlling keypad entries.

5. A method in a wireless network base station for controlling a conference call, comprising:

establishing a conference call between a calling party and at least two called panics;

tracking the order in which called parties are added to the conference call; and creating a private conversation during the conference call between the calling party and one of the at least two called parties whenever the base station receives from the calling party mobile station a select combination of keys that identifies the one of the at least two called parties by the order in which the one of the at least two called parties was added to the conference call.

6. The method of claim 5 further including the step of adding an additional called party to the conference call whenever a series of digits representing a called party phone number are entered on the calling party mobile station keypad along with the "Send" key.

7. The method of claim 5 wherein the base station that tracks the order in which called parties were added to a call interprets a conference call command entered by the calling party as being one that relates to the first called party if a "1" digit key is depressed, to a second called party if a "2" digit is depressed and to a third called party if a "3" digit is depressed.

8. The method of claim 7 wherein the base station creates a private call between the calling party and the first called party if the calling party depresses a "1" digit and a "Send" key.

9. The method of claim 7 wherein the base station creates a private call between the calling party and the second called party if the calling party depresses a "2" digit and a "Send" key.

10. The method of claim 7 wherein the base station creates a private call between the calling party and the third called party if the calling party depresses a "3" digit and a "Send" key.

11. The method of claim 7 wherein the base station drops the first called party if the calling party depresses a "1" key and one of the "*" and the "#" keys.

12. The method of claim 7 wherein the base station drops the second called party if the calling party depresses a "2" key and one of the "*" and the "#" keys.

13. The method of claim 7 wherein the base station drops the third called party if the calling party depresses a "3" key and one of the "*" and the "#" keys.

* * * * *